United States Patent [19]

Minagawa et al.

[11] Patent Number: 5,285,880

[45] Date of Patent: Feb. 15, 1994

[54] METHOD AND APPARATUS FOR CONTROLLING AUTOMATIC TRANSMISSION

[75] Inventors: Yusuke Minagawa; Satoshi Takizawa, both of Kanagawa, Japan

[73] Assignee: Nissan Motor Co., Ltd., Yokohama, Japan

[21] Appl. No.: 886,851

[22] Filed: May 22, 1992

[30] Foreign Application Priority Data

May 23, 1991 [JP] Japan .................................. 3-146627

[51] Int. Cl.$^5$ ........................ F16D 25/11; B60K 41/22
[52] U.S. Cl. ............................... 192/3.58; 192/87.18; 475/128
[58] Field of Search ................. 192/3.58, 87.18, 87.14; 475/128; 74/867

[56] References Cited

U.S. PATENT DOCUMENTS

| | | | |
|---|---|---|---|
| 3,707,890 | 1/1973 | Ito .................................... | 192/3.57 X |
| 4,219,109 | 8/1980 | Ushijima et al. ............... | 192/87.18 X |
| 4,718,310 | 1/1988 | Shindo et al. ................... | 475/128 X |
| 4,790,418 | 12/1988 | Brown et al. .................... | 192/3.58 X |
| 5,029,086 | 7/1991 | Yoshimura ....................... | 74/867 X |
| 5,079,970 | 1/1992 | Butts et al. ..................... | 74/867 X |
| 5,115,722 | 5/1992 | Ichihashi et al. ............. | 192/87.18 X |

OTHER PUBLICATIONS

Nissan Full-Range Electonically Controlled Automatic Transmission RE4R01A Type pp. 1-53—1-73, Mar. 1987.

*Primary Examiner*—Rodney H. Bonck
*Attorney, Agent, or Firm*—Foley & Lardner

[57] ABSTRACT

In an automatic transmission including first and second planetary gear sets and a plurality of friction elements, during an up-shift and a time after the up-shift, a hydraulic pressure of a released friction element is kept at a predetermined value corresponding to the biasing force of a return spring set in the control valve of the friction element for a predetermined time after the end of the up-shift. When a down-shift is carried out immediately after the above-mentioned up-shift, the engagement of the released friction element is rapidly carried out since the hydraulic pressure of the friction element is kept at the predetermined value.

4 Claims, 5 Drawing Sheets

(SOLID LINE ; REAL VALUE, DOTTED LINE; COMMAND VALUE)

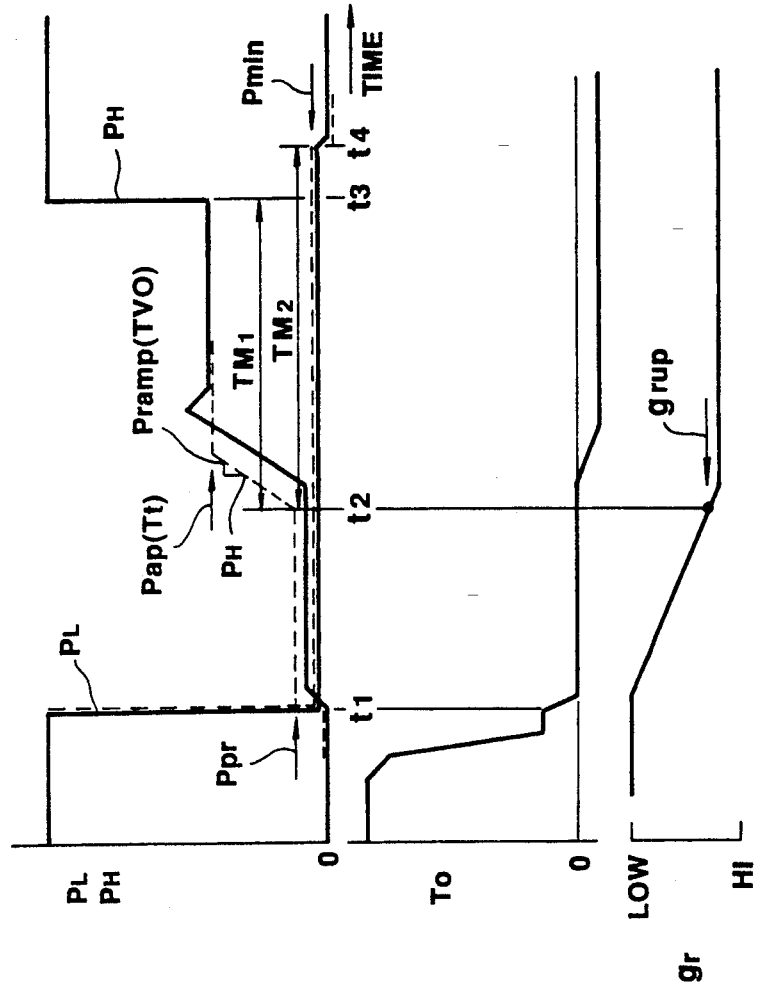

METHOD AND APPARATUS FOR CONTROLLING AUTOMATIC TRANSMISSION

BACKGROUND OF THE INVENTION

1. Field of the Invention

The present invention relates to improvements in a shift control of an automatic transmission, and more particularly to a hydraulic control for friction elements during a shift.

2. Description of the Prior Art

A conventional automatic transmission system includes a plurality of friction elements which selectively change the connecting state for a shift. The change of the connecting state of the friction elements is carried out by controlling a hydraulic circuit included in the automatic transmission system. For example, the hydraulic pressure of one friction element (release element) is lowered to zero for setting the friction element at a released state, and the hydraulic pressure of another friction element (apply element) is raised to a predetermined value for setting the another friction element at an engaged state.

However, if the shift taking place in the above mentioned system is a foot-released upshift, after which a downshift is often carried out, it takes a predetermined time to engage the released friction element such that a downshift can take place immediately after the upshift. Accordingly, this may cause a discomfort shock during the downshift.

SUMMARY OF THE INVENTION

It is an object of the present invention to provide an automatic transmission controlling method and apparatus which is free of the above-mentioned drawbacks.

According to an aspect of the present invention, there is provided a method of a shift control in an automatic transmission drivingly coupled with an engine, the automatic transmission including an input shaft drivingly coupled with the engine, and a plurality of friction elements each of which is set in one of an engaged state and a released state, the change between the engaged and released states of the friction elements being carried out during a shift by operating an engagement control means which applies a hydraulic pressure to the friction element for the engagement, the method comprises a step for lowering a hydraulic pressure applied to the friction element for changing the engaged state to the released state during an upshift; and a step for applying a predetermined pressure to the released friction element after releasing operation while keeping the released state of the released friction element.

According to another aspect of the present invention, there is provided an apparatus for a shift control for an automatic transmission drivingly coupled with an engine, the automatic transmission including an input shaft drivingly coupled with the engine, and a plurality of friction elements each of which is set in one of an engaged state and a released state, the apparatus comprises: means for detecting a signal needed for proceeding an up-shift; and a control unit including; means for generating a release signal after a command for the up-shift which has been made according to the signal from the signal detecting means; and means for controlling release of the engaged friction elements according to the release signal, the release control means changing the connecting state of the engaged friction element by lowering a hydraulic pressure which has been applied to the engaged friction element, the release control means applying a predetermined pressure to the released friction element after lowering the hydraulic pressure while keeping the released state of the released friction element.

With the above-mentioned method and/or apparatus, a predetermined hydraulic pressure is applied to the released friction element for a predetermined time after release in an up-shift. Accordingly, when a down-shift is carried out immediately after the up-shift, the released friction element is rapidly engaged since the hydraulic pressure in the released friction element is kept at a predetermined pressure. This solves the problem of the shift-shock which occurs when the down-shift takes place immediately after the up-shift.

BRIEF DESCRIPTION OF THE DRAWINGS

FIG. 7 is a time-chart diagram during the shift of the embodiment according to the present invention.

DETAILED DESCRIPTION OF THE INVENTION

Figure 1:
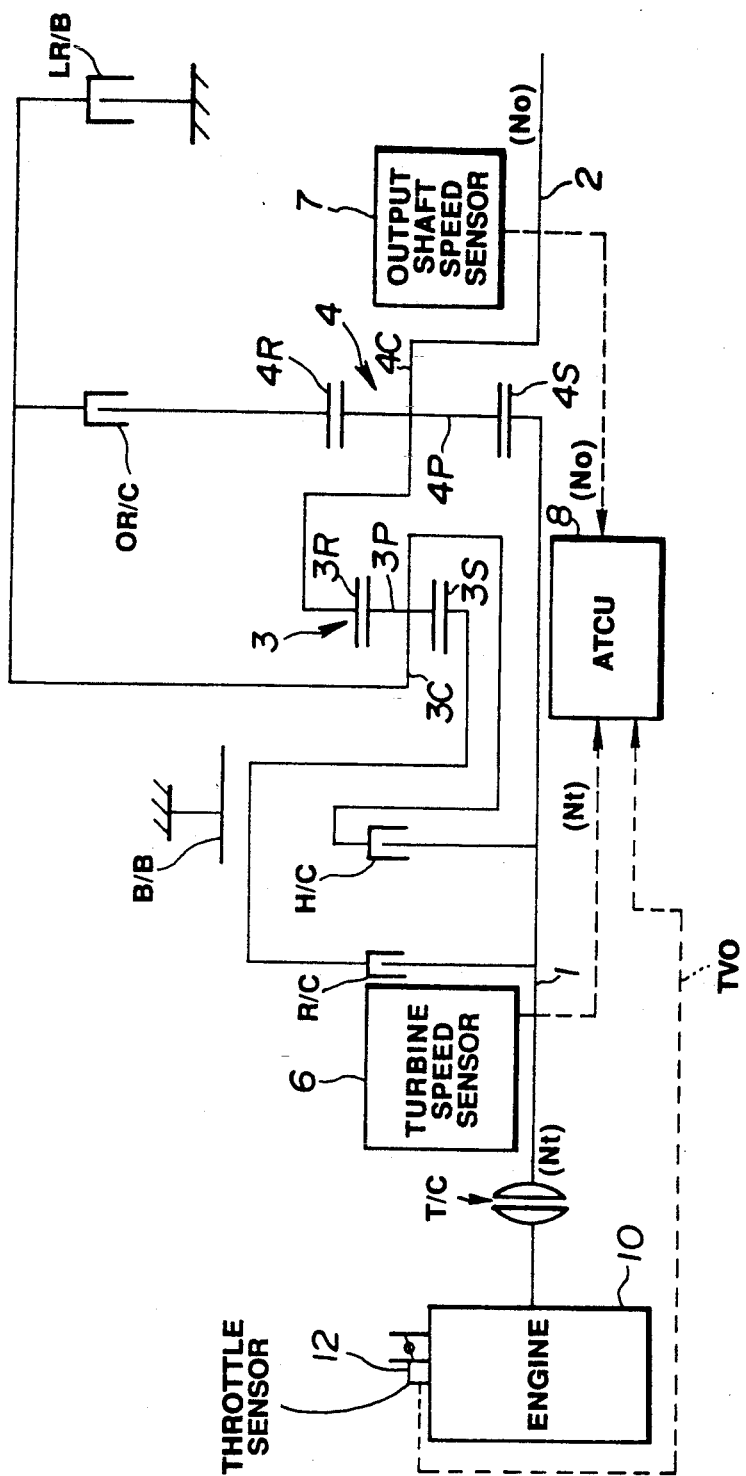
FIG. 1 is a block diagram showing a schematic view of a first embodiment of an automatic transmission according to the present invention.

Referring now to FIGS. 1 to 6, there is shown an embodiment of an automatic transmission system according to the present invention. The automatic transmission system is for an automotive vehicle having an engine 10 with a throttle which opens in degrees in response to manipulation of an accelerator pedal, not shown. The gear train of the automatic transmission system is generally similar to a gear train described on pages I-53 to I-73 of a service manual "NISSAN FULL-RANGE ELECTRONICALLY CONTROLLED AUTOMATIC TRANSMISSION RE4R01A TYPE" published in March 1987 which has been hereby incorporated by reference for showing the background of the invention.

A first planetary gear set 3 and a second planetary gear set 4 are coaxially disposed between an input shaft 1 and an output shaft 2. The first planetary gear set 3 includes a first sun gear 3S, a first ring gear 3R, a first pinion 3P, and a first carrier 3C. The second planetary gear set 4 includes a second sun gear 4S, a second ring gear 4R, a second pinion 4P and a second carrier 4C. The input shaft 1 receives a rotating energy from the engine 10 through a torque converter T/C and is connected to the second sun gear 4C. The input shaft 1 is drivingly connected to the first carrier 3C through a high clutch H/C and to the first sun gear 3S through a reverse clutch R/C. A band brake B/B is engageable to anchor the first sun gear 3S. A low reverse brake LR/B is engageable to anchor the first carrier 3C. A over running clutch OR/C is engageable to connect the first carrier 3C to the second ring gear 4R. The first ring gear 3R is constantly connected to the second carrier 4C which constantly connected to the output shaft 2. The friction elements OR/C, B/B, H/C, LR/B and R/C are selectively engaged to produce the four forward speed and one reverse as shown in the following Table.

TABLE 1

| GEAR | FRICTION ELEMENTS | | | | |
|------|------|-----|-----|------|-----|
|      | OR/C | B/B | H/C | LR/B | R/C |
| 1ST  | E    |     |     | E    |     |
| 2ND  | E    | E   |     |      |     |
| 3RD  | E    |     | E   |      |     |
| 4TH  |      | E   | E   |      |     |
| REV. |      |     |     | E    | E   |

E-Engagement

Figure 2:
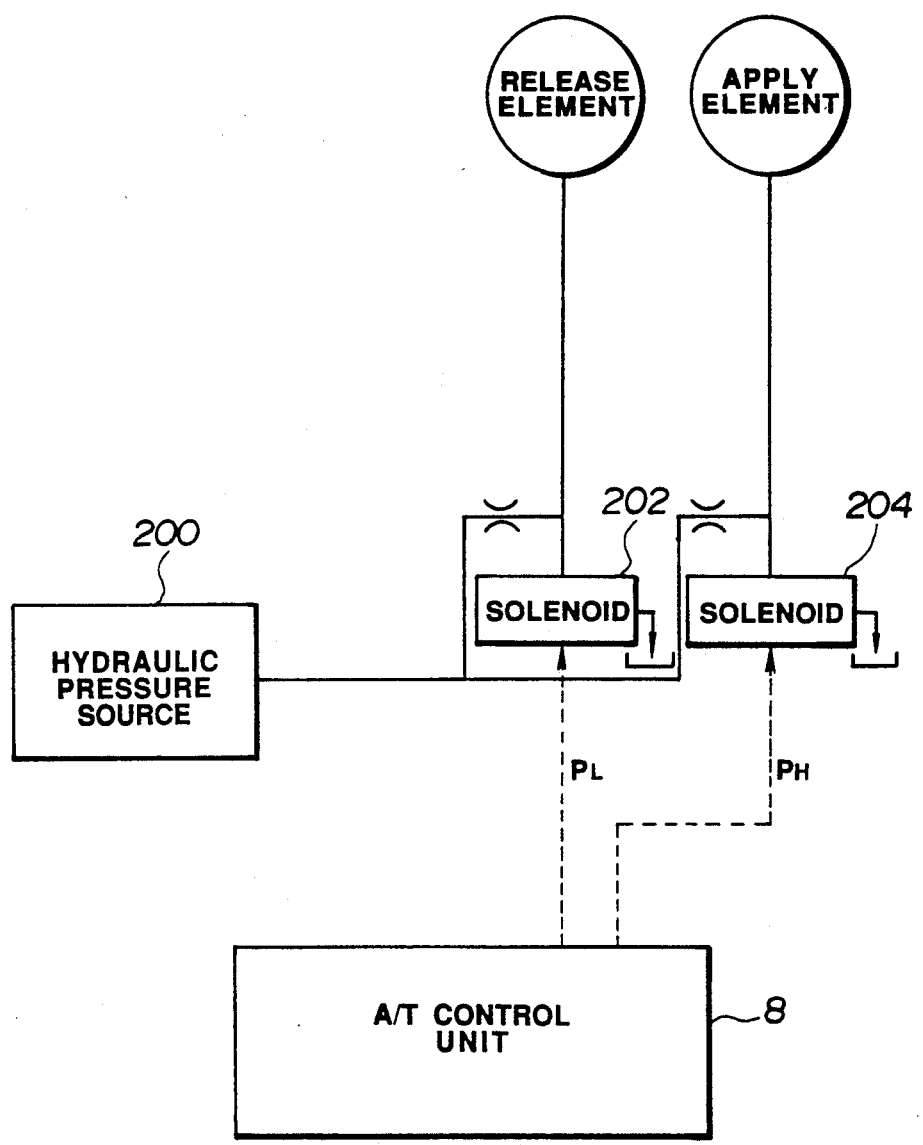
FIG. 2 is a schematic view of a portion of a hydraulic circuit of the automatic transmission according to the present invention.

As shown in FIG. 2, a hydraulic circuit for controlling the connection state of each friction element is communicated with each friction element. The hydraulic circuit includes a hydraulic pressure source 200 which supplies pressurized hydraulic fluid to each friction element. A solenoid 202, 203 is disposed between the hydraulic pressure source 200 and each friction element, and is controlled by the ATCU 8 for varying the hydraulic pressure applied to the friction elements.

In FIG. 1, there is shown an engine speed sensor 5, a turbine speed sensor 6, an output shaft speed sensor 7, an output shaft torque sensor 9 and a throttle sensor 12. The turbine speed sensor 6 detects revolution speed of the input shaft 1 and generates a turbine or input speed indicative signal Nt indicative of the detected revolution speed of the input shaft 1. The output shaft speed sensor 7 detects revolution speed of the output shaft 2 and generates an output speed indicative signal No indicative of the detected revolution speed of the output shaft 2. The throttle sensor 12 detects opening degree of the engine throttle and generates a throttle opening degree indicative signal TVO indicative of the detected opening degree of the engine throttle.

These sensor signals Nt, No and TVO are fed to an automatic transmission control unit (ATCU) 8 which is a microcomputer based unit including an input interface, a central processing unit (CPU), a read only memory (ROM), a random access memory (RAM), an output interface and data bas. During the automatic upshift operation in D-range mode, the shift control is carried out by the ATCU 8 in a manner to carry out the control programs of FIGS. 3 to 6.

Figure 3:
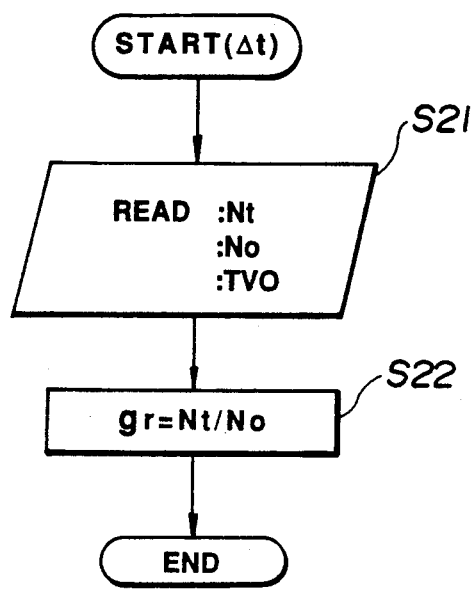
FIG. 3 is a flow-chart which shows a control program for detecting signal from sensors in the embodiment of FIG. 1.

FIG. 3 shows a program for detecting signals from the sensors. The program is carried out as an interruption handling operation at predetermined intervals of time $\Delta t$ such as 10 msec. At a step S21, a turbine speed Nt (an input speed of the automatic transmission), an output speed No, and the throttle opening TVO are measured. Then, the program proceeds to a step S22 wherein a gear ratio $g_r$ ($=N_t/N_o$) of the automatic transmission is calculated.

Figure 4:
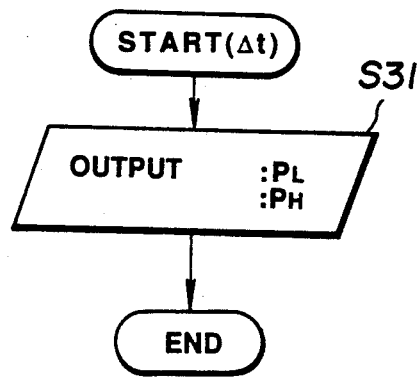
FIG. 4 is a flow-chart which shows a control program for outputting control signals in the embodiment of FIG. 1.

FIG. 4 shows a program for outputting control signals. The program is carried out as an interruption handling operation at a predetermined intervals of time $\Delta t$. At a step S31 in the program, the hydraulic pressure $P_L$ of the release element and the hydraulic pressure $P_H$ of the lock element are outputted to the ATCU 8. Herein, assume that the program is carried out for the 1-2 shift. That is, in this case, the release element is the low reverse brake LR/B and the apply element is the band brake B/B.

Figure 5:
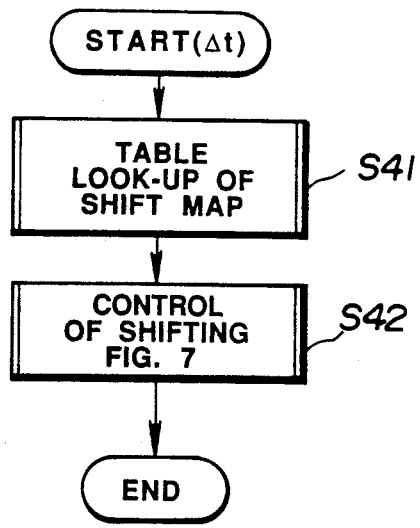
FIG. 5 is a flow-chart which shows a control program for shift control of the embodiment of FIG. 1.

FIG. 5 shows a program for determining the hydraulic pressure $P_L$ of the release element (LR/B) and the hydraulic pressure $P_H$ of the apply element (B/B). The program is also carried out as an interruption handling operation at a predetermined intervals of time $\Delta t$. At a step S41, an adaptive shift position is determined on the basis of the shift pattern map previously memorized in the memory, in accordance with the throttle opening TVO and the the revolution speed No of the output shaft 2 (vehicle speed). Following this, on the basis of comparison between the adaptive shift position and the present shift position, it is judged whether the shift should be carried out or not. Then, when the shift should be carried out, the adaptable shift position is selected. At a step S42, the hydraulic pressure for the release element (LR/B) is lowered according to the selected shift, and the pressure of the apply element (B/B) is raised according to selected shift. For example, during the 1-2 shift, the hydraulic pressure of the low reverse brake LR/B is lowered and the hydraulic pressure of the band brake B/B is raised.

Figure 6:
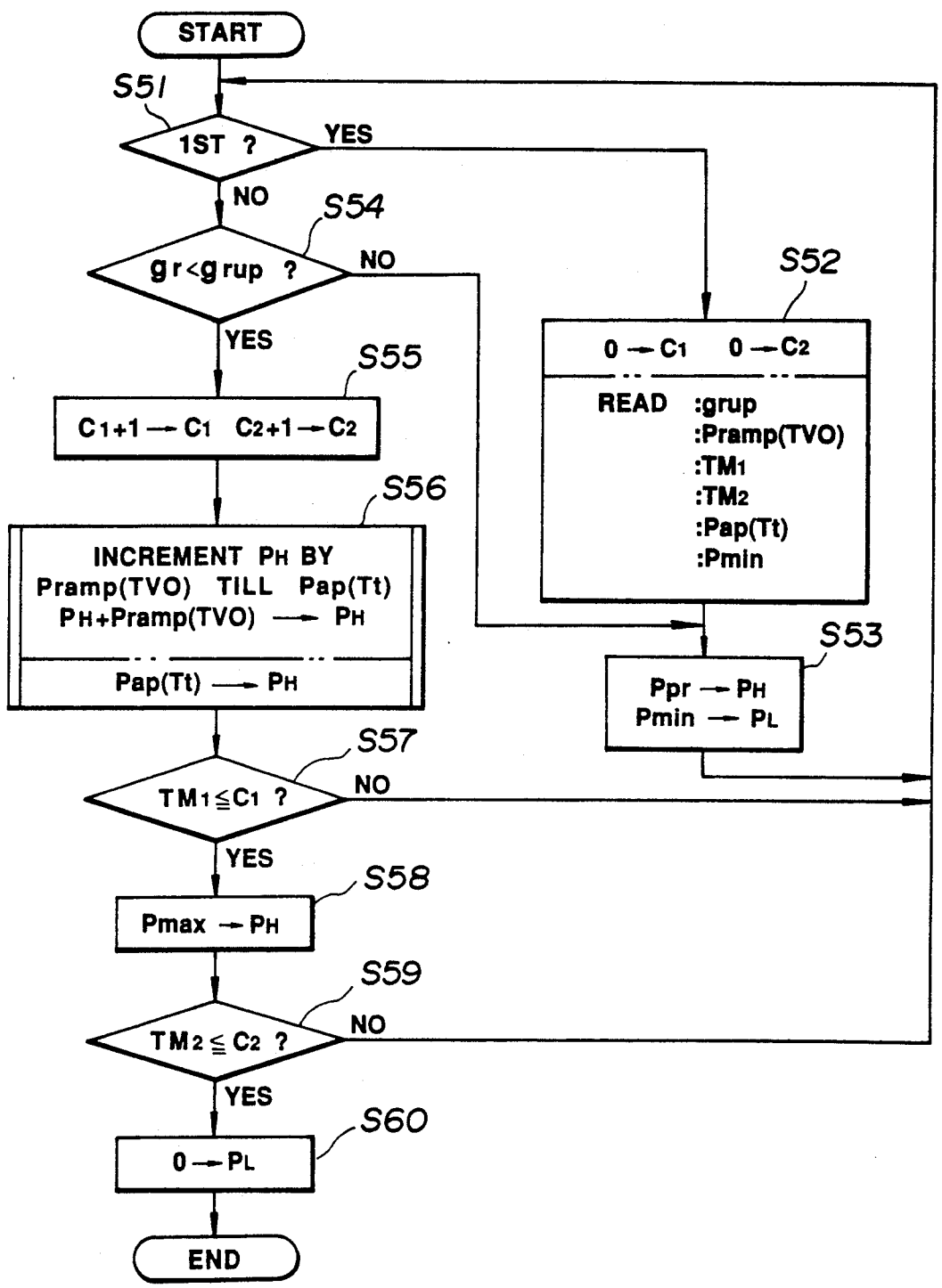
FIG. 6 is a flow-chart which shows a detail control program for shift control according to the present invention.

With the thus control program, the hydraulic pressure $P_L$ and $P_H$ are controlled as shown in FIG. 6.

When it is judged at a step S51 that the routine is a first occurrence, that is, once for a time from 0 to the moment $t_1$, the program proceeds to a step S52 wherein the counters $C_1$ and $C_2$ are cleared to 0. Then, the gear ratio $g_{rup}$ at the end of the inertia phase, the ramp value $P_{ramp}$ (TVO) of the apply element, the timer preset value $TM_1$ of the torque phase, the release timer preset value $TM_2$ of the release element, the shelf pressure $P_{ap}$ (Tt) of the apply element, and the pre-shelf pressure Pmin of the release element are read in the ATCU 8. At a step S53, the hydraulic pressure $P_H$ of the apply element is controlled at a pre-shelf pressure $P_{pr}$ by the pre-charge control, and the hydraulic pressure $P_L$ of the release element is lowered to a pre-shelf pressure $P_{min}$. With the hydraulic pressure control, that is, by controlling the hydraulic pressure $P_L$ of the release element, the inertia phase in the shift is proceeded. The pre-shelf pressure $P_{pr}$ and $P_{min}$ are controlled at a pressure value corresponding to the biasing force of the return spring for the friction element. That is, the pre-shelf pressure $P_{pr}$ and $P_{min}$ are set to be the same as the value gained by dividing the biasing force of the return spring by the cross-sectional area of a piston in the hydraulic circuit. The pre-shelf pressure functions to reduce a loss of piston stroke and not to engage the friction element.

When the repeat of the routine is the second time or more in operation, the program proceeds from the step S51 to a step S54 wherein it is judged whether or not the gear ratio $g_r$ is smaller than the gear ratio $g_{rup}$ at the end of the inertia phase. When the judgement at the step S54 is "No" ($gr \geq g_{rup}$), that is, during the inertia phase corresponding to the time from the moment $t_1$ to the moment $t_2$ of FIG. 6, the program repeats the loop formed by the steps S51, S53 and S54 so as to control the pressure value $P_H$ and the pressure values $P_L$ to $P_{pr}$ and $P_{min}$, respectively. When the judgement at the step S54 is "YES" ($gr < g_{rup}$), that is, when the inertia phase has been finished, the program proceeds to a step S55 wherein the counters C1 and C2 are incremented (C1+1→C1, C2+1→C2). Following this, the program proceeds to a step S56 wherein the apply element pressure $P_H$ is increased to the shelf pressure $P_{ap}$ in such a manner to increase the apply element pressure $P_H$ by the ramp value $P_{ramp}$ (TVO) after the moment $t_2$ (ramp control). When the shelf pressure $P_H$ reaches the shelf pressure $P_{ap}$, the ramp control is stopped and the shelf pressure control is started for keep in the apply element pressure $P_H$ at the shelf pressure $P_{ap}$.

The shelf pressure $P_{ap}$ (Tt) is a calculated value by which the rate of change of the target turbine speed is accomplished, and is represented as a function as follows:

Setting up the equation of motion of each torque during the inertia phase according to the divisional condition of each torque and the inertia of each element, in the case of a foot-released shift of the 1-2 up-shift, the output torque is expressed by the following equation (1):

$$To = K_1 \times Tt + K_2 \times Tbb - K_3 \times T_{LR/B} - K_4 \times (d/dt)\cdot\omega t \quad (1)$$

where $K_1$, $K_2$, $K_3$, $K_4$; coefficient of plus number, $T_t$; turbine torque, $T_{bb}$; transmission torque of band brake, $T_{LR/B}$; transmission torque of low reverse brake=engaged torque, and (d/dt) $\omega t$; the rate of change of the input shaft revolution speed.

When the low reverse brake transmission torque $T_{LR/B}$ is zero in the equation (1), the band brake torque Tbb is expressed by the follow equation (2) which is solved from the equation (1):

$$Tbb = K_1 \times Tot - K_6 \times T_{bb} \times K_7 \times (d/dt)\omega t \quad (2)$$

where $K_5$, $K_6$, $K_7$; coefficient of plus number, $T_{ot}$; a transient torque during a time period T1 which is shorter than the time period T2 when the torque is changed from a pre-shift torque To1 to an after-shift To2, and is obtained from the equation Tot=(T1/t2)×-(To1−To2).

Since the target values of the torque Tot and the rate (d/dt) wt are determined from the calculation, the substantial parameter in the equation (2) is only the turbine torque Tt. Accordingly, the hydraulic pressure of the band brake $P_{bb}$ is expressed as follows:

$$P_{bb} = K_8 \times T_{bb} \quad (3)$$

where $K_8$; a coefficient of plus number.

The manner of operation of the thus arranged control of the automatic transmission will be discussed hereinafter with reference to FIG. 6.

When the up-shift of the automatic transmission is carried out after the output torque To is radically reduced according to the shift control by the program of FIG. 5, the oil pressure $P_L$ of the release element is lowered to a pre-shelf pressure $P_{min}$ from a moment $t_1$ owing to the operation of the step S53 if the up-shift of the transmission is carried out. Accordingly, the hydraulic pressure of the release element is maintained at a pressure value $P_{min}$ which corresponds to the biasing force of the return spring under a released condition of the friction element. At the pressure value $P_{min}$, the release element is not engaged so that the output torque $T_o$ is kept at about zero for a time from the moment $t_1$ to a moment $t_2$. Furthermore, owing to the processing of step S 57, the loop formed by steps S51, S54, S55, S56 and S57 is repeated during a predetermined time $TM_1$ from the moment $t_2$ to a moment $t_3$, that is, during the shift. The oil pressure $P_L$ of the release element is maintained at a pressure value $P_{min}$ for a predetermined time TM2 from the moment $t_2$ to a moment $t_4$. Accordingly, the hydraulic circuit for the release element is kept at the pressure value $P_{min}$ until the time $t_4$. That is, the ATCU 8 functions as a friction element control means by carrying out the above-mentioned loop or the step S53. During this period, the output torque $T_o$ is set at a negative value and serves as engine brake. Thus, by keeping the pressure value of the release element at the valve $P_{min}$ until the moment $t_4$, in the event that the down-shift (accelerating down-shift) which is apt to generally occur after the foot-released up-shift, the pressure value in the hydraulic circuit of the release element is set at the pressure $P_{min}$. Accordingly, the down-shift response of the automatic transmission is remarkably improved due to the above-mentioned arrangement, and a smooth shift by the automatic transmission is realized.

While the invention has been shown and described with reference to the 1-2 shift of a foot released up-shift, it will be understood that the invention is not limited to such an embodiment and the principle of the present invention may be applied to a shift control for other foot-released up-shifts.

What is claimed is:

1. A method of a shift control in an automatic transmission drivingly coupled with an engine, the automatic transmission including an input shaft drivingly coupled with the engine, and a plurality of friction elements each of which is set in one of an engaged state and a released state, the change between the engaged and released states of the friction elements being carried out during a shift by operating an engagement control means which applies a hydraulic pressure to the friction element for the engagement, the method comprising the steps of:

lowering a hydraulic pressure applied to one of the plurality of friction elements in order to change its engaged state to the released state during an upshift; and applying a predetermined pressure to said friction element after the releasing operation while maintaining the friction element in said released state;

wherein the step of applying the predetermined pressure is kept for a predetermined time after the upshift.

2. A method of a shift control in an automatic transmission drivingly coupled with an engine, the automatic transmission including an input shaft drivingly coupled with the engine, and a plurality of friction elements each of which is set in one of an engaged state and a released state, the change between the engaged and released states of the friction elements being carried out during a shift by operating an engagement control means which applies a hydraulic pressure to the friction element for the engagement, the method comprising the steps of:

lowering a hydraulic pressure to one of the friction elements which is changed from an engaged state to a released state during an upshift, from an engagement keeping value to a predetermined value at which the friction element is disengaged; and keeping the predetermined pressure value until a predetermined time has passed after the upshift.

3. An apparatus of a shift control for an automatic transmission drivingly coupled with an engine, the automatic transmission including an input shaft drivingly coupled with the engine, and a plurality of friction elements each of which is set in one of an engaged state and a released state, said apparatus comprising:

means for detecting a signal needed for starting an up-shift; and a control unit including;

means for generating a release signal after a command for the up-shift which has been made according to the signal from said signal detecting means;

means for controlling a hydraulic pressure supplied to one of the friction elements according to the release signal, said control means immediately changing the connecting state of the friction element from an engaged state to a disengaged state by immediately lowering the hydraulic pressure from a friction element engaging value to a predetermined pressure value at which the friction element is disengaged, said control means keeping the predetermined pressure value until a predetermined time has passed after the up-shift.

4. A method of a shift control in an automatic transmission drivingly coupled with an engine, the automatic transmission including an input shaft drivingly coupled with the engine, and a plurality of friction elements each of which is set in one of an engaged state and a released state, the change between the engaged and released states of the friction elements being carried out during a shift by operating an engagement control means which applies a hydraulic pressure to the friction element for the engagement, the method comprising the steps of:

lowering a hydraulic pressure applied to one of the plurality of friction elements in order to change its engaged state to the released state during an up-shift; and applying a predetermined pressure to said friction element after the releasing operation while maintaining the friction element in said released state;

wherein the predetermined pressure is a pressure corresponding to the biasing force of a return spring for the friction element.

* * * * *